United States Patent
Sakamaki et al.

(10) Patent No.: US 6,599,458 B1
(45) Date of Patent: Jul. 29, 2003

(54) CELLULOSE TRIACETATE FILM AND PROCESS FOR PRODUCING THE SAME

(75) Inventors: Satoshi Sakamaki, Minami-Ashigara (JP); Atsushi Adachi, Minami-Ashigara (JP); Toshihiko Minatoya, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 389 days.

(21) Appl. No.: 09/664,438

(22) Filed: Sep. 18, 2000

Related U.S. Application Data

(60) Division of application No. 08/957,018, filed on Oct. 24, 1997, now abandoned, which is a continuation-in-part of application No. 08/546,195, filed on Oct. 20, 1995, now abandoned.

(30) Foreign Application Priority Data

Oct. 20, 1994 (JP) ............................................. 6-255544

(51) Int. Cl.⁷ .............................................. B29C 41/24
(52) U.S. Cl. ........................ 264/216; 264/40.1; 264/217
(58) Field of Search ................................ 264/216, 217, 264/40.1, 40.6

(56) References Cited

U.S. PATENT DOCUMENTS

| 4,499,043 A | * | 2/1985 | Yabe et al. ................. 264/207 |
| 4,770,931 A |   | 9/1988 | Pollock et al. |
| 5,152,947 A |   | 10/1992 | Takeda et al. |
| 5,314,647 A |   | 5/1994 | Rieth |
| 5,374,470 A |   | 12/1994 | Tsujimoto et al. |
| 5,529,737 A |   | 6/1996 | Arrington et al. |
| 5,695,694 A | * | 12/1997 | Iwata et al. ................. 264/1.34 |
| 6,036,913 A | * | 3/2000 | Shibue et al. ................ 264/489 |

FOREIGN PATENT DOCUMENTS

| GB | 1 336 783 | 11/1973 |
| GB | 2 013 559 B | 8/1979 |
| JP | 62 046 625 A | 2/1987 |
| JP | 01 055 214 A | 3/1989 |
| JP | 05 185 445 A | 7/1993 |

* cited by examiner

Primary Examiner—Mark Eashoo
(74) Attorney, Agent, or Firm—Sughrue Mion, PLLC

(57) ABSTRACT

A cellulose triacetate film having a film thickness from 115 to 135 $\mu$m and a Z value of 0.3 or less wherein the Z value is a slope (g/° C.) obtained by plotting tear strength against temperature in a range between −20° C. and +23° C., and a process for producing the same characterized by drying cast film using drying wind having a temperature T° C. which satisfies $T_0-15<T<T_0$, wherein temperature T° C. of the drying wind is in an arbitrary volatile component region and the temperature $T_0$° C. is at an inflexion point obtained by plotting tear strength W of the cellulose triacetate film after drying at the temperature T° C. against drying wind temperature. The film is excellent in low temperature strength, and resistant to breakage of perforations during rewinding under low temperature conditions.

8 Claims, 2 Drawing Sheets

CELLULOSE TRIACETATE FILM AND PROCESS FOR PRODUCING THE SAME

CROSS-REFERENCE TO RELATED APPLICATION

This application is a divisional of U.S. application Ser. No. 08/957,018, filed Oct. 24, 1997, now abandoned, which is a continuation-in-part of U.S. application Ser. No. 08/546,195, filed Oct. 20, 1995, now abandoned.

BACKGROUND OF THE INVENTION

This invention relates to a cellulose triacetate film which is improved in film strength, particularly in practical strength at low temperature, and a process for producing the same.

In general, cellulose triacetate films are produced by the solution casting process. In the solution casting process, cellulose triacetate and plasticizer are dissolved in a solvent mixture of which the principal solvent is methylene chloride and some poor solvents of cellulose triacetate (hereinafter called poor solvent(s)) to obtain a dope, and the dope is fed uniformly from a die continuously on a circulatingly travelling endless support. The solvents are evaporated on the support, and after the dope is solidified, it is stripped from the support. Then, it is dried to obtain the film.

The cellulose triacetate films produced through the above process are excellent in optical properties and mechanical properties, moisture resistance and dimensional stability, and widely utilized as the film base for photographic films.

However, the cellulose triacetate films are insufficient in mechanical strength, such as tear strength, folding endurance, impact strength and flexibility, and troubles occasionally occur, such as tearing, crease, cutout or the like in a film production process, a film exposure operation in camera, etc.

In order to improve the mechanical strength of cellulose triacetate films, various methods have been proposed, such as a method of shrinking the cast film in a shrinkage percentage range from 3 to 20% in the drying process in the solution casting process (Japanese Patent KOKOKU 49-5614), a method of shrinking the cast film similarly in a shrinkage percentage of 20% or more (Japanese Patent KOKOKU 49-4554), and a method of improving film strength, particularly tear strength, by casting a dope to which a poor solvent is added in addition to methylene chloride onto the surface of a band, heating the cast dope layer so as to become in a temperature range from 30 to 42° C. within 3 minutes after casting, and keeping the cast dope layer in the temperature range at least for 15 seconds (as disclosed in GB 2013559) (corresponding to Japanese Patent KOKOKU 61-39890).

Moreover, a method of restraining both planar orientation degree and crystallization degree by controlling the surface temperature and shrinkage percentage of a film to a particular range upon production is also proposed in U.S. Pat. No. 5,152,947 (corresponding to Japanese Patent KOKAI 4-1009).

Incidentally, cellulose triacetate films which are widely used for photographic film, etc. become fragile particularly in low temperature environments, and perforations are occasionally broken by torque upon winding the photographic film. All of the above prior art are directed to the improvement in strength at room temperature, but the improvement in strength at room temperature does not always contribute to the prevention of film from breakage at low temperature.

SUMMARY OF THE INVENTION

An object of the invention is to provide a cellulose triacetate film which is resistant to breakage even at low temperature.

Another object of the invention is to provide a process for producing the same.

The inventors investigated in order to achieve the above objects, and found that temperature variation of tear strength of cellulose triacetate film varies according to drying conditions of cast films. Then, they further investigated, and found that films having a slope of tear strength variation with temperature of a particular value or less have great strength at low temperature, and the films can be obtained under particular drying conditions. One of the particular drying methods is that, there is an inflexion point in a relation between drying wind temperature and tear strength, and drying is conducted at a temperature slightly lower than the inflexion point.

Thus, the present invention provides a cellulose triacetate film which has achieved the above object, which comprises a cellulose triacetate film having a film thickness from 115 to 135 $\mu$m and a Z value of 0.3 or less wherein the Z value is a slope (g/° C.) obtained by plotting tear strength against temperature in a range between −20° C. and +23° C., and a process for producing the same, which comprises casting a dope having a concentration from 15 to 35 wt. % as the sum of cellulose triacetate and other components which will solidify after drying onto an endless support, stripping the cast film from the support, and drying, wherein said drying is conducted using drying wind having a temperature T° C. which satisfies $T_0-15<T<T_0$, wherein temperature T° C. of the drying wind is in an arbitrary volatile component region and the temperature $T_0$° C. is at an inflexion point obtained by plotting tear strength W of the cellulose triacetate film after drying at the temperature T° C. against drying wind temperature.

Figure 1:
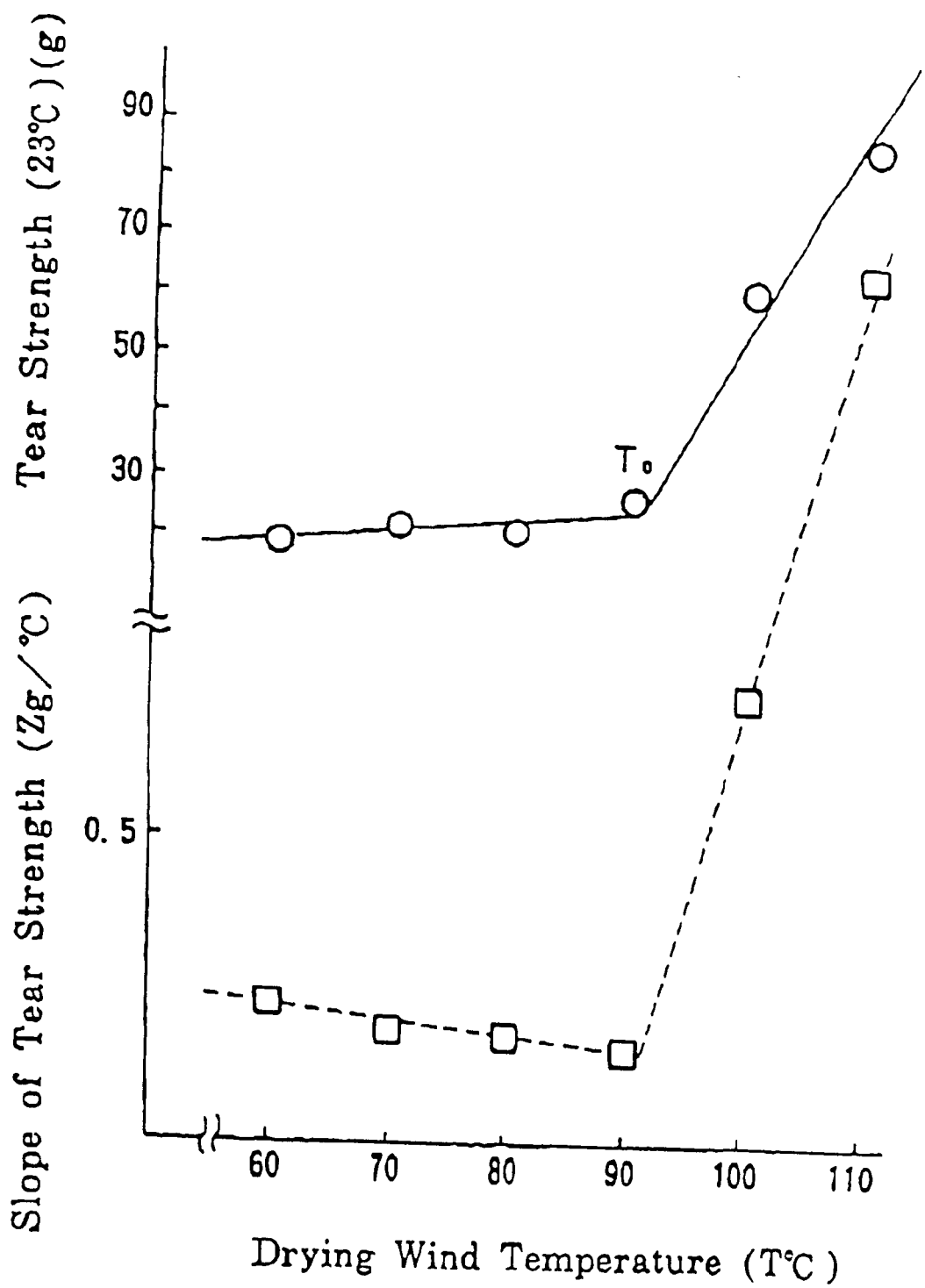
FIG. 1 is a graph indicating a relationship between temperature of drying wind and tear strength or tear strength/temperature obtained in Examples.

1 . . . cooling drum
2 . . . drying chamber
3 . . . cellulose triacetate film
4 . . . casting die
5 . . . stripping roll
6 . . . conveying roller
7 . . . width keeping device

DETAILED DESCRIPTION OF THE INVENTION

The slope Z (g/° C.) of the tear strength of the cellulose triacetate film of the invention is 0.3 or less, preferably 0.28 or less, particularly preferably 0.25 or less. The film thickness is from 115 to 135 $\mu$m, preferably from 120 to 130 $\mu$m.

The inflexion point is determined by drying a cast film with varying only temperature of drying wind, measuring tear strength of each dried film at a constant temperature, and plotting the tear strength against drying wind temperature.

The temperature T° C. of the drying wind is $T_0-15<T<T_0$, preferably $T_010<T<T_0$, particularly preferably $T_05<T<T_0$. A suitable period to which the above drying wind is applied, is at least the period when the content of volatile components (solvents) becomes from 60 wt. % to 10 wt. %, preferably from 50 wt. % to 20 wt. %. The other period may be conventional, he overall drying period is in general, from 20 to 75 minutes.

The drying wind may be air, nitrogen gas,, carbon dioxide gas or the like, and in general, is air. Blowing angle and speed may be conventional. The surface of the cast film to which the drying wind is blown may be one side, but preferably is both sides. The other heating may be co-used as an auxiliary means, such as infrared heater.

The total concentration of cellulose triacetate and other components which will remain as solid after drying in the dope is from 15 to 35 wt. %, preferably from 15 to 25 wt. %.

Cellulose triacetate is substituted with about three acetyl groups per cellulose unit, and usually, the degree of the substitution is indicated by the acetylated degree. As the cellulose triacetate used for the process of the invention, that having an acetylated degree from 56 to 62% is preferred. The raw cellulose for producing the cellulose triacetate may be any known one, such as pulp or linter.

As the other component(s) becoming solid after drying, plasticizer, stripping accelerator and the like are usable.

The plasticizer includes phosphate esters such as triphenyl phosphate, tricresyl phosphate, triethyl phosphate and biphenyldiphenyl phosphate, phthalate esters, such as dimethyl phthalate, diethyl phthalate and dimethoxyethyl phthalate, glycolate esters, such as methylphthalylethyl glycolate and ethylphthalyl-ethyl glycolate, and combinations of them. A blendable amount of the plasticizer is from about 5 to 30 wt. % of the cellulose triacetate. Since excess plasticizer bleeds out from the film during drying, from 5 to 20 wt. % is preferred.

The stripping accelerator is blended in order to shorten the time from feeding the dope to stripping the film from the endless support. As the stripping accelerator, various metal soaps are known, and preferred ones are disclosed in U.S. Pat. Nos. 2,275,716, 3,528,833, 3,793,043, 4,348, 238 and Japanese Patent KOKAI No. 61-243837.

As the solvent other than methylene chloride, there may be used α-amides, alcohols, aromatic compounds, such as monochlorobenzene, benzene and toluene, esters, such as ethyl acetate and propyl acetate, ethers, such as tetrahydrofuran, methyl cellosolve and ethylene glycol monomethyl ether.

Figure 2:
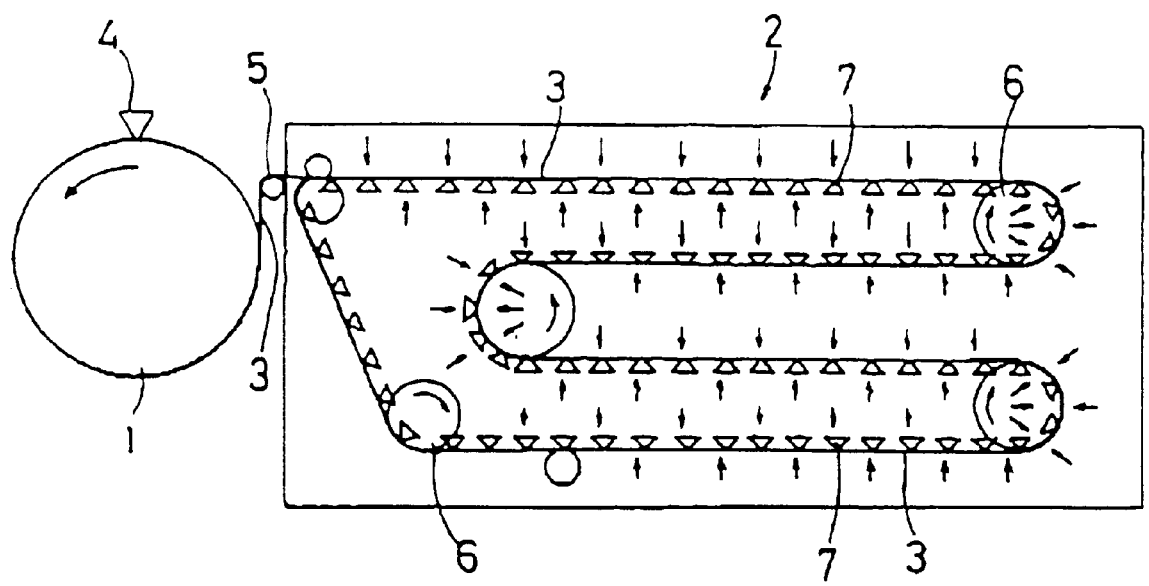
FIG. 2 is a schematic illustration of a drum casting apparatus used for the production of a cellulose triacetate film of the invention.

A drum casting apparatus applicable to the process for producing a cellulose triacetate film of the invention is illustrated in FIG. 2. The casting apparatus is composed of a cooling drum 1 onto which dope is cast, and a drying chamber 2 where the cast film 3 stripped from the cooling drum 1 is dried. A casting die 4 for casting the dope is provided on the cooling drum 1, and a stripping roller 5 for stripping the cast film 3 from the cooling drum 1 is provided between the cooling drum 1 and the drying chamber 2. The drying chamber 2 is provided with conveying rollers 6 for conveying the film 3, width keeping devices 7 for keeping the width of the film 3, and a hot air blowing means (not illustrated) for blowing hot air to traveling film 3. It is preferable that the cooling drum is cooled to 10° C. or less.

In the inventions, breakage trouble of perforations of photographic film at low temperature is prevented by lowering the slope of tear strength against temperature. Optimal low temperature properties of film can be obtained in predetermined recipe and manufacturing conditions by keeping drying wind temperature within the range from the inflexion point of tear strength to lower than that by 15° C. It was also found by the inventors that strength at room temperature does not always relate to breakage of film under low temperature conditions but relates to the degree of slope against temperature, as can be seen from Examples.

EXAMPLES

Dope compositions composed of cellulose triacetate, triphenyl phosphate, biphenyldiphenyl phosphate, methylene chloride, methanol and butanol were prepared.

The particular dope compositions are given in Table 1.

TABLE 1

|  | Invention | | Comparative | | |
|---|---|---|---|---|---|
|  | 1 | 2 | 1 | 2 | 3 |
| Dope composition | wt.% | wt.% | wt.% | wt.% | wt.% |
| Cellulose triacetate | 20.3 | 16.3 | 20.3 | 19.1 | 20.3 |
| Triphenyl phosphate | 2.2 | 1.6 | 2.2 | 1.9 | 2.2 |
| Biphenyldiphenyl phosphate | 1.1 | 0.8 | 1.1 | 0.9 | 1.1 |
| Methylene chloride | 62.7 | 74.8 | 62.7 | 69.5 | 62.7 |
| Methanol | 11.5 | 6.5 | 11.5 | 3.1 | 11.5 |
| n-Butanol | 2.2 | 0 | 2.2 | 5.5 | 2.2 |

Cellulose triacetate films were formed by casting the dope using either the drum apparatus shown in FIG. 2 or a band apparatus. The cooling drum of the drum apparatus was kept between −3 and −5° C. Each cast film was dried in the drying chamber by partially blowing air having a temperature from 60° C. to 110° C. as shown in FIG. 1. The solvent content of the dried film was from 0.5 to 1.5 wt. %

A summary of the casting conditions is provided in Table 2.

TABLE 2

|  | Invention | | Comparative | | |
|---|---|---|---|---|---|
|  | 1 | 2 | 1 | 2 | 3 |
| Casting Support | Drum | Band | Drum | Band | Drum |
| Support Temp. | −5° C. | 25–45° | −5° | 25–45° | −5° C. |
| Time arriving at 30° C. | After 20 sec. | After 16 sec. | After 35 sec. | After 17 sec. | After 20 sec. |
| Time staying in 30–42° C. | For 10 sec. | For 15 sec. From 16 sec later For 50 sec. From 120 sec. later | For 20 sec. | For 11 sec. | For 10 sec. |

Drying wind temperature between 1.5 to 2 minutes after casting is as follows:

| Invention 1 | $T < T_0$ |
| Invention 2 | $T < T_0$ |
| Comparative 1 | $T < T_0$ |
| Comparative 2 | $T < T_0$ |
| Comparative 3 | $T > T_0 + 10$ |

It will be noted that in Table 2, "Time arriving at 30° C." and "Time staying in 30–42° C.", the temperatures of 30° C. and 30–42° C. are at the surface of cast film.

It will further be noted that the values given for time staying in the 30–42° C. range for Invention 2 indicate that, about after 16 seconds, the cast film entered the 30–42° C. range, went out of this range after about 31 seconds, entered this 30–42° C. range again after about 120 seconds, and went out of this range again after about 170 seconds.

Samples of each dried film were conditioned with moisture by leaving at 25° C. at 65% RH for 3 hours or more, and notched by a razor. Resisting force (g) upon tearing in the vertical direction was measured under the above conditions using a light load tearing tester (TOYO SEIKI SEISAKU-SHO). Tearing length was 60 mm. The slope Z (g/° C.) of tearing strength against temperature was determined by measuring tear strength at 23.0° C., 0° C., –20° C. using the light load tearing tester and calculating by the method of least squares. The relation between drying wind temperature and tearing strength measured at room temperature is shown in FIG. 1 by a full line, and the relation between drying wind temperature and slope Z of tearing strength against temperature is shown in FIG. 1 by a broken line. The slope Z tg/° C.) was lowered with elevating temperature T (° C.) up to the inflexion point $T_0$ of the full line (preferable), and then, turned to elevate sharply beyond $T_0$ (unpreferable). A photographic emulsion was applied to each film. The film was cut and punched to form a 35 mm photographic film, and wound in to a cartridge. Then, the photographic film cartridge was loaded in a camera with a motor driving mechanism (NIKON F3 MD-4, motor voltage: 16.8V) in an atmosphere at –20° C., and automatically rewound up to the last. After rewinding, the photographic film was taken out, and damage of perforations was evaluated by visual observation. The results are summarized in the following Table 3 wherein mark ( ) indicates excellent without defects, mark× indicates the occurrence of rupture, and mark Δ indicates the occurrence of crack not ruptured.

TABLE 3

|  | Slope (g/° C.) | Camera Test | Film Thickness ($\mu$) | Tear Strength at 23° C. (g) |
|---|---|---|---|---|
| Invention 1 | 0.21 | 0 | 122 | 45 |
| Invention 2 | 0.21 | 0 | 127 | 41 |
| Comparative 1 | 0.44 | X | 127 | 42 |
| Comparative 2 | 0.33 | Δ | 122 | 42 |
| Comparative 3 | 0.78 | X | 127 | 83 |

As shown in the above Table 3, break strength by the camera test at low temperature is not always correlated with strength at room temperature but is correlated with the slope against temperature.

Further, results are summarized in Table 4.

TABLE 4

|  |  | Invention | | Comparative | | |
|---|---|---|---|---|---|---|
|  |  | 1 | 2 | 1 | 2 | 3 |
| Tear strength (g) | | | | | | |
| at | 23° C. | 45 | 41 | 45 | 41 | 83 |
|  | 0° C. | 40 | 36 | 35 | 34 | 72 |
|  | –20° C. | 36 | 32 | 26 | 27 | 49 |
| Z | (g/° C.) | 0.21 | 0.21 | 0.44 | 0.33 | 0.78 |
| t* |  | 40 | 36 | 35 | 34 | 67 |

* y = Zx + t

In the claims:

1. A process for producing a cellulose triacetate film which comprises casing a dope, containing a solvent which is principally methylene chloride and having a concentration from 15 to 35 wt. % as the sum of cellulose triacetate and other components which will solidify after drying, onto an endless support to form a cast film, stripping the cast film from the support, and drying, wherein said drying is conducted using drying wind having a temperature T° C. which is applied at least during the period of drying the cast film from a volatile-components content from 60 wt. to 10 wt. % and which satisfies $T_0-15<T_0$, and wherein temperature T° C. of the drying wind is in an arbitrary drying region and the temperature $T_0$° C. is at an inflexion point obtained by plotting tear strength W of the cellulose triacetate film after drying at the temperature T° C. against drying wind temperature.

2. The process of claim 1 wherein the temperature T° C. satisfies $T_0-10<T<T_0$.

3. The process of claim 1 wherein the drying wind having temperature T° C. is applied to at least the period of drying the cast film from a volatile components content from 50 wt. % to 20 wt. %.

4. The process of claim 1 wherein said drying is conducted using drying wind having a temperature of from 75° C. to 90° C.

5. A process for producing a cellulose triacetate film which comprises casting a dope, having a concentration from 15 to 35 wt. % as the sum of cellulose triacetate and other components which will solidify after drying, onto -an endless support to form a cast film, stripping the cast film from the support, and drying, wherein said drying is conducted by determining a range of temperature T° C. by plotting tear strength W of the cast film after drying at a temperature T° C. against drying wind temperature and using a drying wind having a temperature T° C. which satisfies $T_0-15<T<T_0$, the temperature $T_0$° C. being at an inflexion point obtained by the plotting of the tear strength W of the cast film after drying at the temperature T° C. against drying wind temperature.

6. The process of claim 5 wherein the temperature T° C. satisfies $T_0-10<T<T_0$.

7. The process of claim 5 wherein the drying wind having temperature T° C. is applied to at least the period of drying the cast film from a volatile components content from 50 wt. %to 20 wt. %.

8. The process of claim 5 wherein said drying is conducted using drying wind having a temperature of from 75° C. to 90° C.

* * * * *